United States Patent [19]

Yoshida

[11] Patent Number: 5,943,672
[45] Date of Patent: Aug. 24, 1999

[54] NETWORK SYSTEM

[75] Inventor: Kenishi Yoshida, Kitamoto, Japan

[73] Assignee: Hitachi, Ltd., Tokyo, Japan

[21] Appl. No.: 08/802,795

[22] Filed: Feb. 18, 1997

[30] Foreign Application Priority Data

Feb. 15, 1996 [JP] Japan .................................. 8-027572
Jul. 3, 1996 [JP] Japan .................................. 8-173296

[51] Int. Cl.⁶ .................................................. G06F 17/30
[52] U.S. Cl. ................................... 707/10; 707/8; 707/9; 707/101; 707/200; 395/200
[58] Field of Search ........................... 707/8, 9, 10, 101, 707/200; 395/200

[56] References Cited

U.S. PATENT DOCUMENTS

| | | | |
|---|---|---|---|
| 4,803,614 | 2/1989 | Banba et al. ............................. | 200/11 J |
| 5,151,989 | 9/1992 | Johnson et al. ........................... | 707/10 |
| 5,325,505 | 6/1994 | Hoffecker et al. ....................... | 707/101 |
| 5,537,401 | 7/1996 | Tadamura et al. ....................... | 370/409 |
| 5,644,763 | 7/1997 | Roy ........................................ | 707/101 |
| 5,675,791 | 10/1997 | Bhide et al. ............................. | 707/205 |

OTHER PUBLICATIONS

"Comparative Models of the File Assignment Problem" Lawrence W. Dowdy and Derrell V. Foster. pp. 287–313. vol. 14, No. 2, Jun. 1982.

Primary Examiner—Wayne Amsbury
Assistant Examiner—Shahid Alam
Attorney, Agent, or Firm—Antonelli, Terry, Stout & Kraus, LLP

[57] ABSTRACT

A network system having a plurality of databases wherein data are respectively stored, a plurality of terminals for use in retrieving data in the databases, a plurality of connecting devices for connecting the databases and the terminals, and a control unit for giving data-caching instructions to connecting devices selected on the basis of the results of analysis of data concerning access logs with respect to the databases. When a demand for data retrieval is made from a terminal and when data to be retrieved exits in a connecting device that has received a data-caching instruction, the data is made the result of retrieval. The analysis of data concerning an access log is made at predetermined time intervals.

11 Claims, 5 Drawing Sheets

NETWORK SYSTEM

BACKGROUND OF THE INVENTION

The present invention relates to a computer network and more particularly to a mechanism for automatically arranging cache sites whose setting positions have heretofore been determined manually.

A data transfer amount has heretofore been reduced by manually assigning an proper arrangement of copies (hereinafter referred to as caches) of data which are frequently retrieved so as to decentralize retrieval processes in proportion to an increase in the data transfer amount over a network. Although an attempt has also been made to automate the selection of an arrangement of caches, as surveyed in a case study, for example, "Comparative Models of the File Assignment Problem", by L. W. Dowdy and D. V. Foster, Computing Surveys, Vol. 14, No.2, June 1982, such a proposal still remains conceptual.

SUMMARY OF THE INVENTION

Although a manual selection of the arrangement of cache sites is effective as stated above, skill have been essential to such selection. An object of the present invention is to provide a network with an automatic data cache system capable of quickly dealing with a change in any access amount to the network without requiring human intervention.

This object above can be accomplished by providing a control unit for totalizing and analyzing log data concerning data transfer over a network, whereby the optimum positions of cache sites are automatically computed, and connecting devices for caching data under instructions from the control unit are arranged over the network.

DESCRIPTION OF THE PREFERRED EMBODIMENTS

Figure 1:
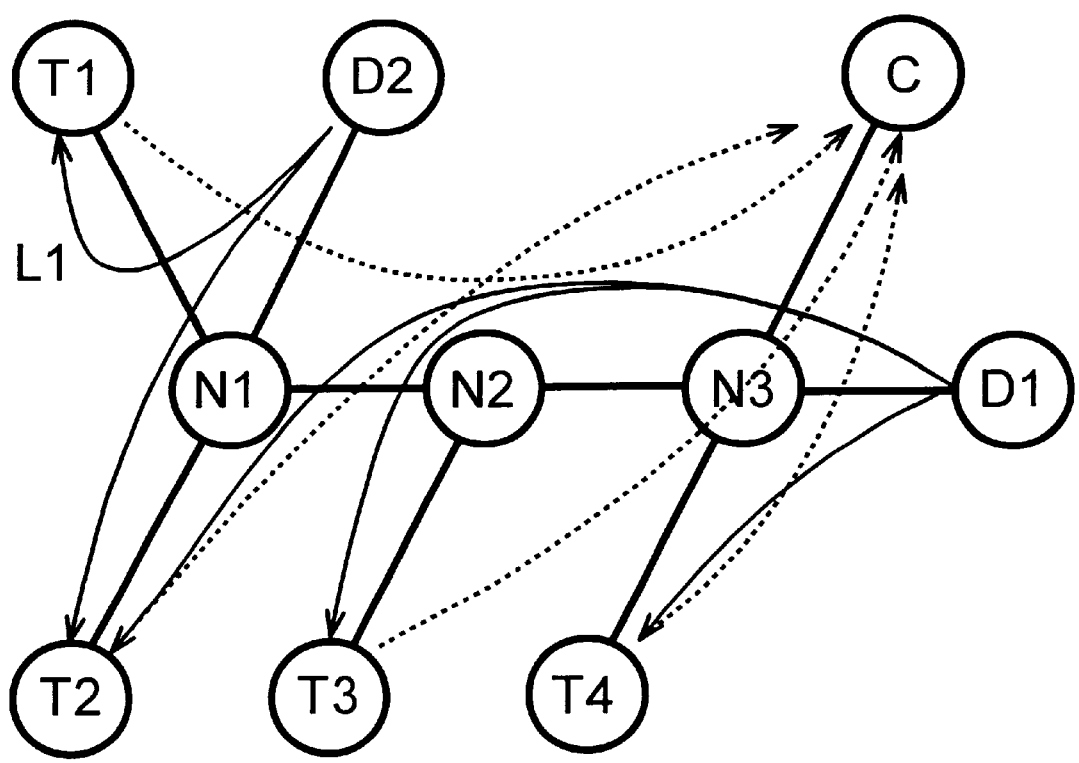
FIG. 1 is a diagram which shows an example of a database structure with databases distributed over a network.

FIG. 1 illustrates an exemplary arrangement of data bases which are distributed over a network embodying the present invention. In FIG. 1, encircled D1, D2 represent data bases in which data is stored (which may be ordinary computers and hereinafter are referred to as D or D1, D2 . . . ); encircled T1, T2, T3, T4 represent terminals for retrieving data (which may also be computers and hereinafter are referred to as T or T1, T2 . . . ); and encircled N1, N2, N3 represent computer-to-computer connecting devices (which are also shown as nodes and may be computers and hereinafter referred to as N or N1, N2 . . . ). An encircled C represents a control unit which may be a computer whose function will be described later.

Straight solid lines in FIG. 1 indicate paths on which the computers are connected over a network and each curved solid line therein indicates that a terminal T is retrieving the contents of data in the database D. The databases D store different contents of data and, for example, the curved line L1 indicates that the terminal T1 is retrieving the contents of data in the database D2. When any terminal T retrieves the content of data in a database D, a a communication as to which one of the terminals has retrieved data in a specific database is sent to the control unit C as an access log, as represented by a curved dotted line in FIG. 1.

Data to be transmitted to the control unit C as access logs are as shown in Table 1 on the assumption that the data retrieval is conducted over the network as shown in FIG. 1 and that data traffic at this time is as follows: when T2 retrieves data in D1, the traffic is set to 1; when T1 retrieves data in D2, the traffic is set to 3; when T2 retrieves data in D2, the traffic is set to 2; and in any other case, the traffic is set totally to 1.

TABLE 1

| Data name | Data-transfer starting computer | Data transit node | Data-transfer terminating computer | Traffic |
| --- | --- | --- | --- | --- |
| D1 | D1 | N3,N2,N1 | T2 | 1 |
| D1 | D1 | N3,N2 | T3 | 1 |
| D1 | D1 | N3 | T4 | 1 |
| D2 | D2 | N1 | T1 | 3 |
| D2 | D2 | N1 | T2 | 2 |

Figure 2:
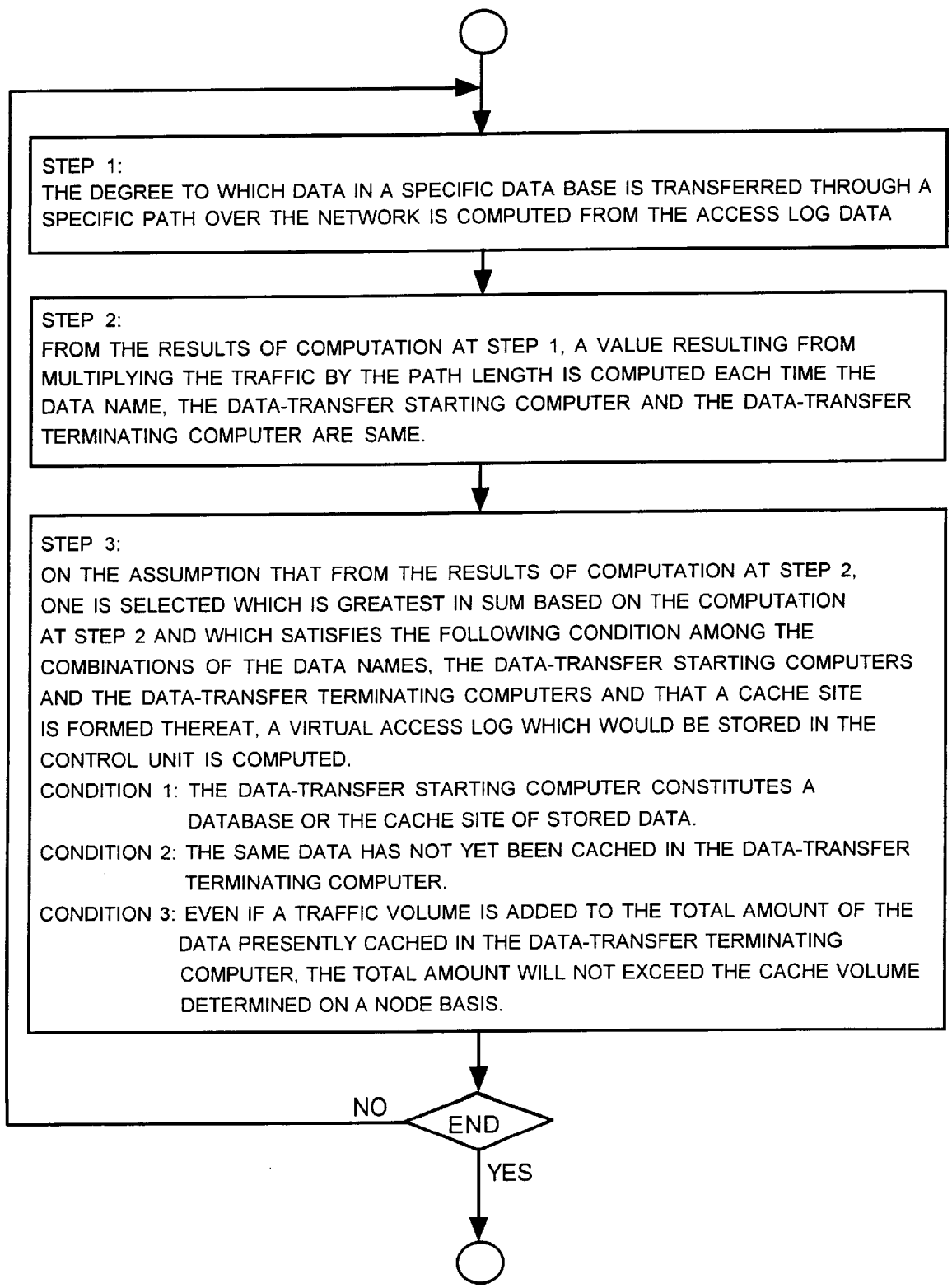
FIG. 2 is a flow diagram which shows an example of a processing algorithm for a control unit.

The control unit C stores the data listed in Table 1 beforehand and makes computations according to two processing procedures at predetermined time intervals. In other words, as seen in FIG. 2 the degree to which data in a specific data base is transferred through a specific path over the network is computed from the access log data at STEP 1. When data is transmitted from a database D via n nodes N to a terminal T at this time, all of the intermediate paths included in the whole path are considered to be totally different, the intermediate paths ranging from an intermediate path having a path length of n up to what is in the path 1. In this case, however, any path containing a terminal is not considered as a data-transfer terminating node. In a case where the data stored in the control unit C is as shown in Table 1, the results of computation conform to those shown in Table 2.

TABLE 2

| Data name | Data-transfer starting computer | Data-transfer terminating computer | Traffic | Path length |
| --- | --- | --- | --- | --- |
| D1 | D1 | N1 | 1 | 3 |
| D1 | D1 | N2 | 1 | 2 |
| D1 | N3 | N1 | 1 | 2 |
| D1 | D1 | N3 | 1 | 1 |
| D1 | N3 | N2 | 1 | 1 |
| D1 | N2 | N1 | 1 | 1 |
| D1 | D1 | N2 | 1 | 2 |
| D1 | D1 | N3 | 1 | 1 |
| D1 | N3 | N2 | 1 | 1 |

TABLE 2-continued

| Data name | Data-transfer starting computer | Data-transfer terminating computer | Traffic | Path length |
|---|---|---|---|---|
| D1 | D1 | N3 | 1 | 1 |
| D2 | D2 | N1 | 3 | 1 |
| D2 | D2 | N1 | 2 | 1 |

At STEP 2, subsequently, from the results of computation at STEP 1, a value resulting from multiplying the traffic by the path length is computed each time the data name, the data-transfer starting computer and the data-transfer terminating computer are the same. Simultaneously, the maximum value of the traffic is stored likewise. Table 3 shows the results of computation with reference to Table 2. Since there are two sets of data combinations each having the data names D1, the data-transfer starting computers N3 and the data-transfer terminating computers N2 in Table 2, for example, the sum 2 of two values of a value 1 resulting from multiplying the traffic 1 by the path length 1 are registered in Table 3. Moreover, 1 is stored since the traffic is 1 in both cases.

TABLE 3

| Data name | Data-transfer starting computer | Data-transfer terminating computer | Sum | Traffic |
|---|---|---|---|---|
| D1 | D1 | N1 | 3 | 1 |
| D1 | D1 | N2 | 4 | 1 |
| D1 | D1 | N3 | 3 | 1 |
| D1 | N3 | N1 | 2 | 1 |
| D1 | N3 | N2 | 2 | 1 |
| D1 | N2 | N1 | 1 | 1 |
| D2 | D2 | N1 | 5 | 3 |

At STEP 3, subsequently, on the assumption that, from the results of computation at STEP 2, one data name is selected which has been greatest in sum based on the computation at STEP 2 and which satisfies the following condition among the combinations of the data names, the data-transfer starting computers and the data-transfer terminating computers, and that a cache site is formed thereat, a virtual access log which would be stored in the control unit is computed.

Condition 1: the data-transfer starting computer constitutes a database or the cache site of stored data.

Condition 2: the same data has not yet been cached in the data-transfer terminating computer.

Condition 3: even if the traffic volume is added to the total amount of the data presently cached in the data-transfer terminating computer, the total amount will not exceed the cache volume determined on a node basis.

Figure 3:
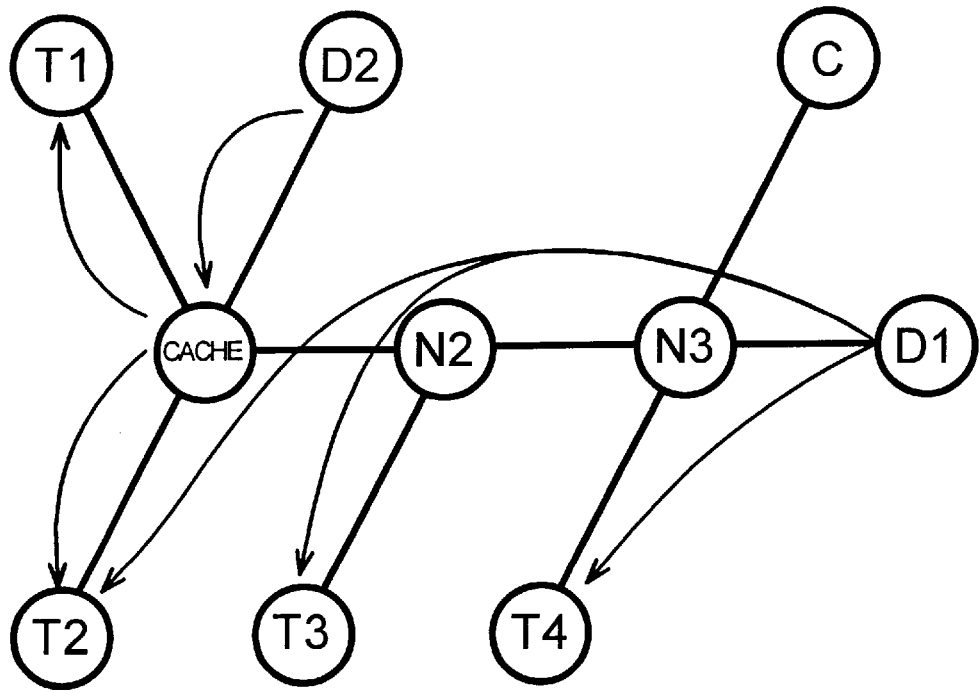
FIG. 3 is a diagram which shows an example of a cache disposed over a network.

In an example of Table 3, the data name D2, the data-transfer starting computer D2 and the data-transfer terminating computer N1 are selected and then a virtual access log in Table 4 is output. FIG. 3 shows a network structure having a cache in this case.

TABLE 4

| Data name | Data-transfer starting computer | Data transit node | Data-transfer terminating computer | Traffic |
|---|---|---|---|---|
| D1 | D1 | N3,N2,N1 | T2 | 1 |
| D1 | D1 | N3,N2 | T3 | 1 |
| D1 | D1 | N3 | T4 | 1 |
| D2 | D2 |  | N1 | 3 |
| D2 | N1 |  | T1 | 3 |
| D2 | N1 |  | T2 | 2 |

It is only needed to modify the table (Table 1 in this case) stored with the access log which is being processed as follows, so that the virtual access log is prepared.

A data name, a data-transfer starting computer, a data-transfer terminating computer and traffic are extracted from the initially-selected entries in Table 3 and these are added to Table 1 as the data name, the data-transfer starting computer, the data-transfer terminating computer and the traffic. Then, a node necessary for the data-transfer starting computer and the data-transfer terminating computer which are to communicate with each other is stored as a data transit node. The fourth field from the top in Table 4 denotes the data added to Table 1 through the process above.

Subsequently, the data-transfer terminating computer in the field in which the data name conforms to the data-transfer starting computer in Table 1, including the data-transfer terminating computer in the field selected from Table 3 as a data transit node, is changed to the data-transfer terminating computer selected from Table 3. Moreover, the data transit node is also changed to what is necessary for the data-transfer terminating computer to communicate with a new data-transfer terminating computer. The lower two fields in Table 4 indicate the two data in Table 1 thus changed through the process above.

Figure 4:
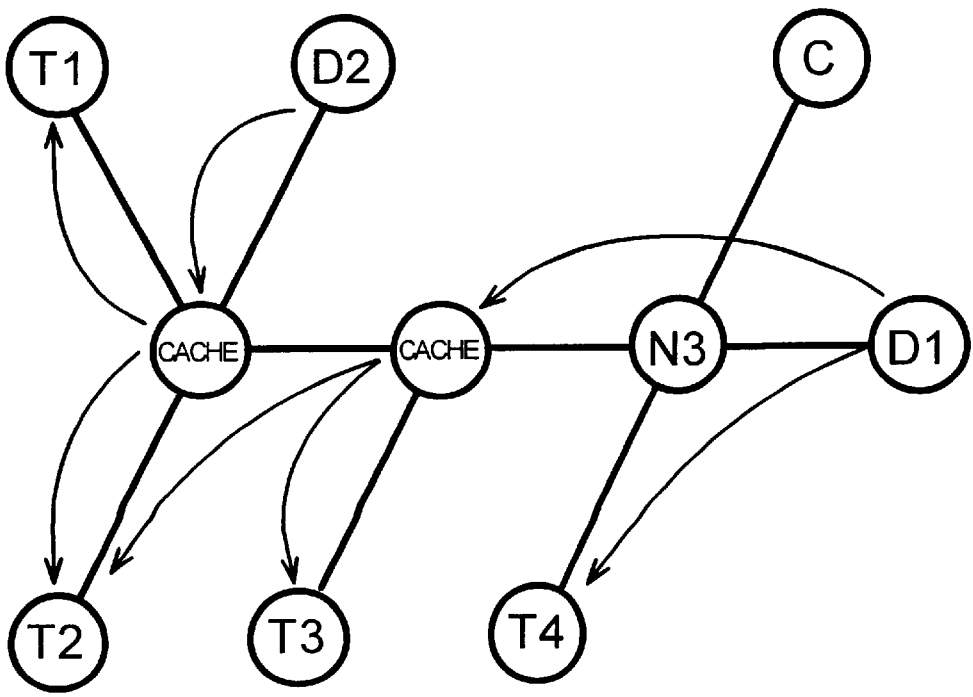
FIG. 4 is a diagram which shows another example of caches disposed over a network.

The process starting with STEP 1 on the basis of the virtual access log thus prepared is repeated a predetermined number of times. On the assumption that the process above is designated to be repeated twice, for example, it will result in obtaining a network structure in which, as shown in FIG. 4, the cache of D1 and that of D2 are prepared for the nodes N2 and N1, respectively.

Figure 5:
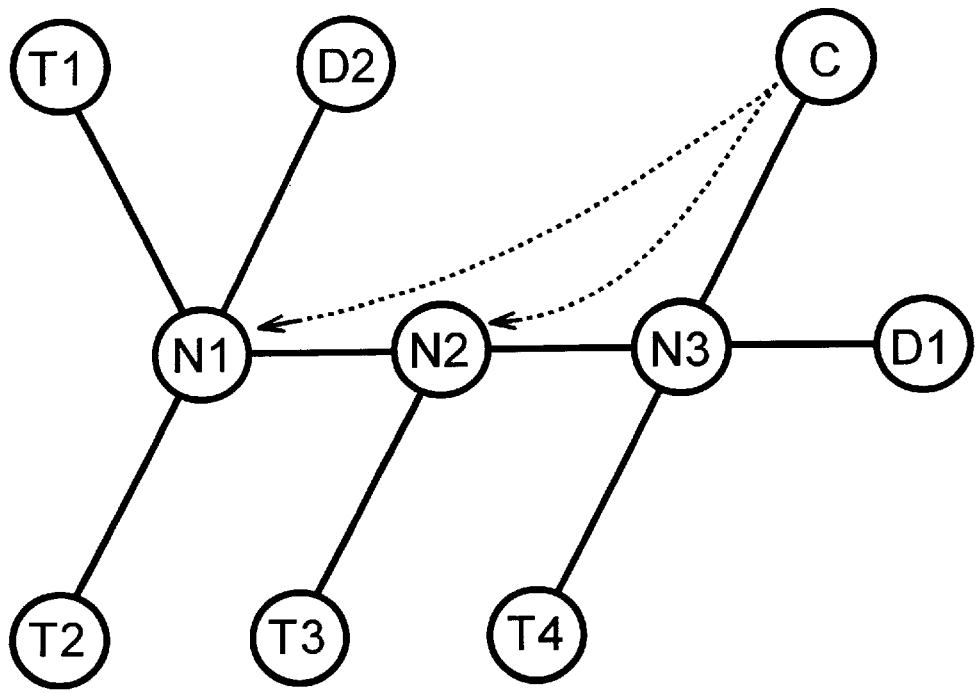
FIG. 5 is a diagram which shows an example in which a control unit gives caching instructions to connecting devices.

The control unit C designates each node to cache the data so that a desired network structure is attained as shown in FIG. 5 after the data processing of FIG. 2 is terminated. In a case where a request for data retrieval is newly made from a terminal T, then, data at a cache site becomes the result of retrieval when the data exists at the cache site midway. In the absence of such a request, the control unit C initially copies data from a database N at the cache site and then transmits the data at the cache site to the terminal demanding retrieval as the result of retrieval.

A description will subsequently be given of another embodiment of the present invention by reference of the accompanying drawings.

Figure 6:
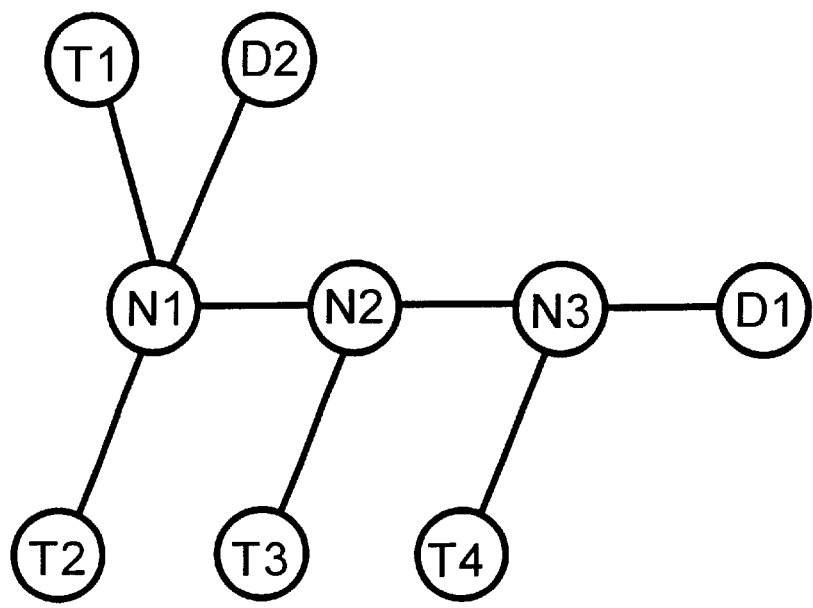
FIG. 6 is a diagram which shows another example of a database structure with databases distributed over a network.

FIG. 6 is a diagram illustrating another network structure embodying the present invention. What makes the embodiment of FIG. 6 different from that of FIG. 1 is that connecting devices N1, N2, N3 are simultaneously used as control units, which pass judgment on the kind of data to be cached on a connecting device basis. At this time, N1, N2, N3 as control units pass judgment on the kind of data to be cached in accordance with the criteria illustrated in Table 5.

TABLE 5

| | |
|---|---|
| Access log record | For recording communications of data passed through each connecting device as access logs; in reference of Table 1, for example: traffic 1 of D1, traffic 5 of D2 at connecting device N1: traffic 2 of D1 at connecting device N2: and traffic 3 of D1 at connecting device N3. |
| Decision on cache data | For deciding the each of a predetermined number of data from high-order traffic among the data recorded then in access logs on a connecting device basis. Further, the access log is initialized and thereafter decision on cache data is periodically repeated in accordance with the access log newly recorded. |

Figure 7:
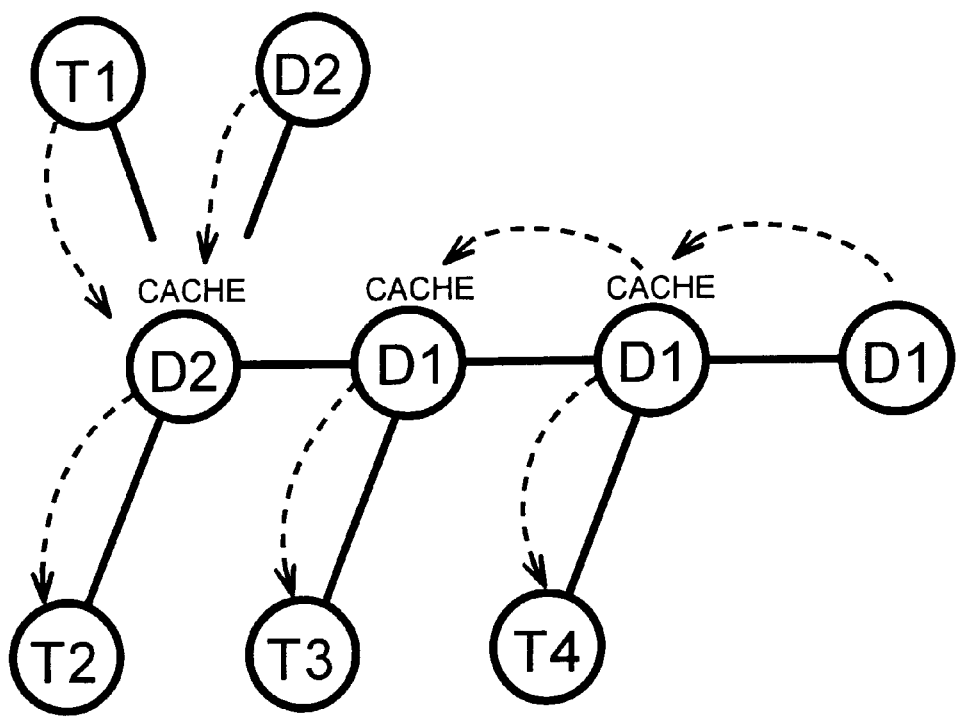
FIG. 7 is a diagram which shows another example of caches disposed over a network.

With the data retrieval conducted over the network as exemplified in Table 1, data of only one high-order kind (i.e, data having the greatest traffic) is cached in each connecting device. The data which then flows through the connecting device N1 and has the greatest traffic is D2, whereas what flows through the connecting devices N2, N3 and has the greatest traffic is D1. Since N1 caches the data D2 and since N2, N3 cache D1, the data flows after caches are arranged as illustrated in FIG. 7.

Since D1 is cached at only one place in the preceding embodiment of the present invention, an efficient cache configuration is adopted, whereas, in the following embodiment thereof, a simplified configuration is used because data transfer between the caches and the control unit is not required. Therefore, it a feature in both cases that a caching method corresponding to proper data exchange over the network is automatically determined.

In both of the above-described embodiments of the present invention, the caching method is to be repeatedly reviewed through analysis of the access log at periodic time intervals. The analysis above may be repeated at predetermined time intervals then or otherwise automatically may be altered by reference to the quantity of recorded access log. The process of analyzing the access log, moreover, is not limited to those shown in FIG. 2 and Table 5 as long as information on the data transfer over the network is input and data to be cached at each connecting device is output.

As is obvious from the above-described embodiments of the present invention, the manual selection of the cache site can be dispensed with, whereby it is possible to provide a data caching method capable of quickly dealing with a change in any access amount to a network.

What is claimed is:

1. A network system, comprising:
   a plurality of databases;
   a plurality of terminals for data retrieving purposes;
   a plurality of connecting devices for connecting the databases and the terminals through a network; and
   a control unit for controlling the connecting devices,
      wherein the control unit analyzes log data collected in the control unit regarding data transferred over the network and automatically computes appropriate data to be cached and an optimum site for caching said data based on said analysis, wherein said optimum site is a selected one of said connecting devices.

2. A network system as claimed in claim 1, wherein each of the connecting devices is used together with the aforesaid control unit and judges the kind of data to be cached on a connecting device basis.

3. A network system, comprising:
   a plurality of databases wherein data are respectively stored;
   a plurality of terminals for use in retrieving data in the databases;
   a plurality of connecting devices for connecting the databases and the terminals through a network; and
   a control unit for giving data-caching instructions to connecting devices,
      wherein log data concerning the database and the connecting devices over the network are collected in the control unit and appropriate data to be cached and an optimum site for caching said data are computed based on the results of an analysis of the log data with respect to the databases, wherein said optimum site is a selected one of said connecting devices.

4. A network system as claimed in claim 3, wherein when a demand for data retrieval is made from a terminal and when data to be retrieved exits in a connecting device that has received a data-caching instruction, the data is made the result of retrieval.

5. A network system as claimed in claim 3, wherein the analysis of data concerning an access log is made at predetermined time intervals.

6. A network system, comprising:
   a plurality of databases wherein data are respectively stored;
   a plurality of terminals for use in retrieving data in the databases; and
   a plurality of connecting devices for connecting the databases and the terminals through a network, and for caching appropriate data at an optimum site thereof based on the result of an analysis of data concerning access log data concerning data transferred over the network with respect to the databases collected in the connecting device, wherein said optimum cite is a selected one of said connecting devices.

7. A network system as claimed in claim 6, wherein the connecting device is made to cache data having the greatest traffic.

8. A network system as claimed in claim 6, wherein the analysis of data concerning an access log is made at predetermined time intervals.

9. A control unit for use in a network system which includes a plurality of databases, a plurality of terminals for retrieving data, and a plurality of connecting devices for connecting the databases and the terminals through a network, said control unit comprising:
   means for analyzing log data concerning data transferred over the network system which are collected in the control unit; and
   means for automatically computing appropriate data to be cached and an optimum site for caching said data based on the results of said analyzing means, wherein said optimum site is a selected one of said connecting devices.

10. A connecting device for use in a network system which includes a plurality of databases, a plurality of terminals for retrieving data and a control unit, said connecting device comprising:
   means for determining a method to cache data and a method to transfer data over the network system; and means for caching data according to said control unit which analyzes log data regarding data transferred over the network system, and the analysis serves as the basis for a computation of appropriate data to be cached in said connected device.

11. A terminal for data retrieving purposes for use in a network system which includes a plurality of databases, a plurality of connecting devices for connecting the databases and a control unit, said terminal comprises:

means for determining a method to cache data and a method to fetch data over the network system; and means for fetching cached data from one of the connecting devices in which cached data is stored according to an indication by the control unit which analyzes log data regarding data transferred over the network system to compute the data cached in said connecting device.

* * * * *